US011524642B2

(12) United States Patent
Ye et al.

(10) Patent No.: US 11,524,642 B2
(45) Date of Patent: Dec. 13, 2022

(54) SYSTEM AND METHOD FOR SETTING INFORMATION ABOUT VEHICLE

(71) Applicants: HYUNDAI MOTOR COMPANY, Seoul (KR); KIA MOTORS CORPORATION, Seoul (KR); HYUNDAI MOBIS CO., LTD., Seoul (KR)

(72) Inventors: Kwang Hae Ye, Seoul (KR); In Sun Oh, Incheon (KR); Ji Heon Kwon, Seoul (KR); Hyoung Taek Choi, Seongnam-si (KR)

(73) Assignees: HYUNDAI MOTOR COMPANY, Seoul (KR); KIA MOTORS CORPORATION, Seoul (KR); HYUNDAI MOBIS CO., LTD., Seoul (KR)

( * ) Notice: Subject to any disclaimer, the term of this patent is extended or adjusted under 35 U.S.C. 154(b) by 252 days.

(21) Appl. No.: 16/822,209

(22) Filed: Mar. 18, 2020

(65) Prior Publication Data

US 2021/0061202 A1 Mar. 4, 2021

(30) Foreign Application Priority Data

Sep. 3, 2019 (KR) .......................... 10-2019-0109016

(51) Int. Cl.
*B60R 16/037* (2006.01)
*G07C 5/00* (2006.01)
*H04L 67/565* (2022.01)
*G07C 5/08* (2006.01)
*H04W 4/44* (2018.01)
*H04W 4/50* (2018.01)

(52) U.S. Cl.
CPC ............ *B60R 16/037* (2013.01); *G07C 5/008* (2013.01); *H04L 67/565* (2022.05)

(58) Field of Classification Search
USPC ........................................................... 701/36
See application file for complete search history.

(56) References Cited

U.S. PATENT DOCUMENTS

| 2011/0106375 | A1* | 5/2011 | Gurusamy Sundaram .................. H04W 4/00 701/31.4 |
| 2016/0176409 | A1* | 6/2016 | Kirsch ...................... B60N 2/02 701/1 |
| 2018/0018179 | A1* | 1/2018 | Scheufler .............. H04L 67/306 |
| 2018/0345889 | A1* | 12/2018 | Pinkelman ........... B60N 2/0248 |
| 2021/0309232 | A1* | 10/2021 | Goto .................... G06V 40/174 |

FOREIGN PATENT DOCUMENTS

KR 10-0559986 B1 3/2006

* cited by examiner

*Primary Examiner* — Tyler D Paige
(74) *Attorney, Agent, or Firm* — Morgan, Lewis & Bockius LLP

(57) ABSTRACT

A system for setting information about a vehicle includes a collection vehicle that obtains data, and a server that receives the data from the collection vehicle, determines whether the data is applicable to user configuration information of a new vehicle, and determines whether to transform the data depending on whether the data is applicable to the user configuration information of the new vehicle so as to control a controlled device located in the new vehicle according to user configuration information stored in vehicles of at least one or more models.

10 Claims, 7 Drawing Sheets

SYSTEM AND METHOD FOR SETTING INFORMATION ABOUT VEHICLE

CROSS-REFERENCE TO RELATED APPLICATION

The present application claims the benefit of priority to Korean Patent Application No. 10-2019-0109016, filed on Sep. 3, 2019 in the Korean Intellectual Property Office, the entire contents of which is incorporated herein by reference.

TECHNICAL FIELD

The present disclosure relates to a system and method for setting information about a vehicle.

BACKGROUND

Recently, technologies of controlling devices in a vehicle through control of a portable terminal based on wired and wireless communication between the portable terminal and the vehicle have been developed. However, when a user controls his or her portable terminal while driving, this results in a degraded concentration level of the user and causes vehicle accidents. Thus, technologies of automatically performing a service corresponding to personal tastes of the user while driving were developed. However, because specifications differ for each vehicle, when a type of vehicle differs, it is difficult to apply the personal tastes of the user in the same manner.

SUMMARY

The present disclosure has been made to solve the above-mentioned problems occurring in the prior art while advantages achieved by the prior art are maintained intact.

An aspect of the present disclosure provides a system and method for setting information about a vehicle to control a controlled device located in a new vehicle according to user configuration information stored in vehicles of at least one or more models.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a system for setting information about a vehicle may include: a collection vehicle that obtains data, and a server that receives the data from the collection vehicle, determines whether the data is applicable to user configuration information of a new vehicle, and determines whether to transform the data depending on whether the data is applicable to the user configuration information of the new vehicle.

The data may include user configuration information, inputted by a plurality of users, of the collection vehicle.

The user configuration information of the collection vehicle or the new vehicle may include control values respectively set for a plurality of controlled devices located in the collection vehicle or the new vehicle.

Each of the plurality of controlled devices may include an electronic device which is located in the collection vehicle and is controlled by a controller of the collection vehicle.

The new vehicle may transmit information about a first user and information about the new vehicle to the server, when the first user who rides in the new vehicle is recognized.

The server may determine whether the data is applicable to first user configuration information of the first user riding in the new vehicle depending on whether first user configuration information of the first user riding in the collection vehicle that is the same model as the new vehicle is included in the data, when the information about the first user and the information about the new vehicle are received from the new vehicle.

The server may determine that the data is applicable to the first user configuration information of the first user riding in the new vehicle, when the first user configuration information of the first user riding in the collection vehicle that is the same model as the new vehicle is included in the data, and may transmit the first user configuration information of the first user riding in the new vehicle to the new vehicle.

The server may determine that the data is not applicable to the first user configuration information of the first user riding in the new vehicle, when the first user configuration information of the first user riding in the vehicle that is the same model as the new vehicle is not included in the data, and may determine whether first user configuration information of the first user riding in the collection vehicle that is a different model from the new vehicle is included in the data.

The server may transform the data such that the first user configuration information of the first user riding in the collection vehicle that is the different model from the new vehicle is applicable to the first user configuration information of the first user riding in the new vehicle, when the first user configuration information of the first user riding in the collection vehicle that is the different model from the new vehicle is included in the data, and may transmit the transformed data to the new vehicle.

The server may determine whether second user configuration information of a second user riding in the collection vehicle that is the same model as the new vehicle is included in the data, when the first user configuration information of the first user riding in the collection vehicle that is the different model from the new vehicle is not included in the data.

The server may transform the data such that the second user configuration information of the second user riding in the collection vehicle that is the same model as the new vehicle is applicable to the first user configuration information of the first user riding in the new vehicle, when the second user configuration information of the second user riding in the collection vehicle that is the same model as the new vehicle is included in the data and may transmit the transformed data to the new vehicle.

According to another aspect of the present disclosure, a method for setting information about a vehicle may include: obtaining, by a collection vehicle, data and transmitting, by the collection vehicle, the data to a server, determining whether the data is applicable to user configuration information of a new vehicle, and determining whether to transform the data as a result of the determination.

The data may include user configuration information of the collection vehicle, the user configuration information being input from a plurality of users.

The user configuration information may include control values respectively set for a plurality of controlled devices located in the collection vehicle or the new vehicle.

Each of the plurality of controlled devices may include an electronic device which is located in the collection vehicle and is controlled by a controller of the collection vehicle.

The method may further include transmitting information about a first user and information about the new vehicle to the server, when the first user who rides in the new vehicle is recognized.

The method may further include determining whether the first user configuration information of the first user riding in the collection vehicle that is the same model as the new vehicle is included in the data, when the information about the first user and the information about the new vehicle are received from the new vehicle.

The method may further include determining that the data is applicable to first user configuration information of the first user riding in the new vehicle, when the first user configuration information of the first user riding in the collection vehicle that is the same model as the new vehicle is included in the data and transmitting the first user configuration information of the first user riding in the new vehicle to the new vehicle.

The method may further include determining that the data is not applicable to the first user configuration information of the first user riding in the new vehicle, when the first user configuration information of the first user riding in the collection vehicle that is the same model as the new vehicle is not included in the data and determining whether first user configuration information of the first user riding in the collection vehicle that is a different model from the new vehicle is included in the data.

The method may further include transforming the data such that the first user configuration information of the first user riding in the collection vehicle that is the different model from the new vehicle is applicable to the first user configuration information of the first user riding in the new vehicle, when the first user configuration information of the collection vehicle that is the different model from the new vehicle is included in the data and transmitting the transformed data to the new vehicle.

The method may further include determining whether second user configuration information of a second user riding in the vehicle that is the same model as the new vehicle is included in the data, when the first user configuration information of the first user riding in the collection vehicle that is the different model from the new vehicle is not included in the data.

The method may further include transforming the data such that the second user configuration information of the second user riding in the vehicle that is the same model as the new vehicle is applicable to the first user configuration information of the first user riding in the new vehicle, when the second user configuration information of the second user riding in the vehicle that is the same model as the new vehicle is included in the data, and transmitting the transformed data to the new vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
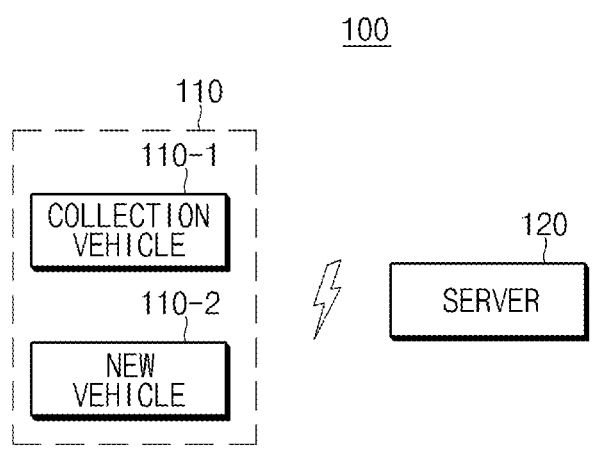
FIG. 1 is a block diagram illustrating a configuration of a system for setting information about a vehicle according to an exemplary embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of a system for setting information about a vehicle according to an exemplary embodiment of the present disclosure.

As shown in FIG. 1, the system for setting the information about the vehicle according to an exemplary embodiment of the present disclosure may include a vehicle 110 and a server 120.

The vehicle 110 may include a collection vehicle 110-1 for obtaining data and a new vehicle 110-2 in which user configuration information is not set.

The collection vehicle 110-1 may be a vehicle of the same or different model from the new vehicle 110-2 and may obtain data of a user who rides in the collection vehicle 110-1. Herein, the data may include configuration information of the collection vehicle 110-1 and user information, received from a plurality of users. The configuration information of the collection vehicle 110-1 may include control values respectively set for a plurality of controlled devices located in the collection vehicle 110-1. As an example, the configuration information may include a control value set for a vehicle seat, a control value set for a room mirror/side mirror, a control value set for a steering wheel, a control value set for an air conditioning device, a control value set for a multimedia device, or the like. Furthermore, the user information may include information capable of distinguishing a user who rides in the collection vehicle 110-1. As an example, the user information may include a user authentication key received from a portable terminal of the user or physical or behavioral characteristics of the user, recognized using a sensor. The collection vehicle 110-1 may transmit the collected data to the server 120.

The new vehicle 110-2 may refer to a vehicle in a state where a plurality of controlled devices located in the new vehicle 110-2 are set by initial control values because there is no configuration information input from a first user. When the first user who rides in the new vehicle 110-2 is recognized, the new vehicle 110-2 may transmit information about the first user and information about the new vehicle 110-2 to the server 120. Herein, the information about the first user may include an identification number of a portable terminal of the first user. The information about the new vehicle 110-2 may include a vehicle identification number (VIN). When receiving configuration information from the server 120, the new vehicle 110-2 may apply the received configuration information to generate the first user information of the new vehicle 110-2.

The server 120 may receive data from the collection vehicle 110-1 to generate a transform formula for applying the data to the new vehicle 110-2, may calculate configuration information of the new vehicle 110-2 based on the transform formula, and may determine whether to transmit the calculated configuration information of the new vehicle 110-2 to the new vehicle 110-2 depending on whether the data is applicable to the new vehicle 110-2.

Figure 2:
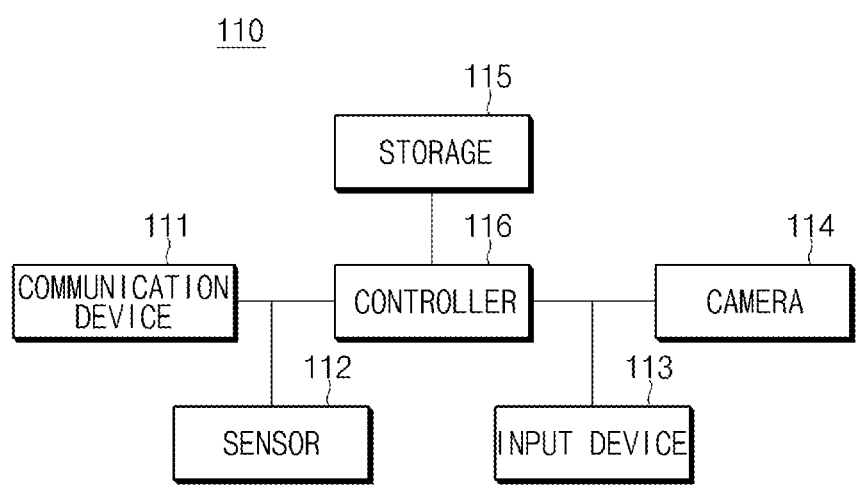
FIG. 2 is a block diagram illustrating a configuration of a vehicle according to an exemplary embodiment of the present disclosure.

FIG. 2 is a block diagram illustrating a configuration of a vehicle according to an exemplary embodiment of the present disclosure.

As shown in FIG. 2, a vehicle 110 according to an exemplary embodiment of the present disclosure may include a collection vehicle 110-1 and a new vehicle 110-2 of FIG. 1. Each of the collection vehicle 110-1 and the new vehicle 110-2 may include a communication device 111, a sensor 112, an input device 113, a camera 114, and a controller 116.

The communication device 111 of each of the collection vehicle 110-1 and the new vehicle 110-2 may be a hardware device implemented by various electronic circuits, e.g., processor(s), and may be communicatively connected with a server 120 of FIG. 1 in a wired or wireless manner to transmit user configuration information or a plurality of user information, obtained based on an input signal output from the input device 113 or a sensing value of the sensor 112, to the server 120. Furthermore, the communication device 111 may be communicatively connected with a portable terminal of the user in a wired or wireless manner to receive a user authentication key from the portable terminal of the user. The communication device 111 may be connected by a universal serial bus (USB) cable when wiredly connected and may be connected through wireless-fidelity (Wi-Fi) direct communication when wirelessly connected. According to an exemplary embodiment of the present disclosure, the communication device 111 may be connected through short-range wireless communication, for example, wireless broadband (Wibro), world interoperability for microwave access (WiMAX), Bluetooth, radio frequency identification (RFID), infrared data association (IrDA), ultra wideband (UWB), or ZigBee.

The sensor 112 may obtain configuration information of a controlled device located in the vehicle 110 and user information. Herein, the controlled device may include an electronic device, which is included in the vehicle 110 and is controlled by the controller 116, for example, a vehicle seat, a room mirror/side mirror, a steering wheel, an air conditioning device, a multimedia device, or the like. The sensor 112 may obtain configuration information of a controlled device, including a control value set for a vehicle seat, a control value set for a room mirror/side mirror, a control value set for a steering wheel, a control value set for an air conditioning device, a control value set for a multimedia device, or the like. Furthermore, the sensor 112 may include a biometric sensor to obtain user information including physical or behavioral characteristics of the user. Herein, the physical characteristics may include characteristics such as a fingerprint, an iris, a retina, a hand, or a face of the user. The behavioral characteristics may include an operation (gesture), a voice, a signature, or the like of the user.

The input device 113 may output an input signal which is an electrical signal corresponding to at least any one of a manipulation, an operation, and/or a voice of the user. In detail, the input device 113 may output configuration information of a controlled device located in the vehicle 110 in response to at least any one of a manipulation, an operation, and/or a voice of the user. At least one of a scroll wheel, a button, a knob, a touch screen, a touch pad, a lever, a track ball, an operation sensor, and/or a speed recognition sensor or a combination thereof may be employed as the input device 113.

The camera 114 may be located in the vehicle 110 to obtain user information including physical or behavioral characteristics of the user who rides in the vehicle 110. The camera 114 may include a charge-coupled device (CCD) camera or a complementary metal-oxide semiconductor (CMOS) color image sensor.

The storage 115 may store data including a plurality of user information obtained by the sensor 112 and the camera 114 and user configuration information input by a plurality of users. The storage 115 may include at least one of a flash memory, a hard disc, a memory card, a read-only memory (ROM), a random access memory (RAM), an electrically erasable programmable ROM (EEPROM), a programmable ROM (PROM), a magnetic memory, a magnetic disc, and/or an optical disc.

The controller 116 of each of the collection vehicle 110-1 and the new vehicle 110-2 may be implemented by various processing devices such as a microprocessor and the like, in which a semiconductor chip or the like capable of calculating or executing various commands is embedded and may control an overall operation of the vehicle 110 according to an exemplary embodiment of the present disclosure.

The controller 116 may store a plurality of user information obtained by the sensor 112 and the camera 114 and user configuration information input by the user in the storage 115. Herein, the user configuration information may include control values respectively set for a plurality of controlled devices located in the vehicle 110.

The controller 116 may control the communication device 111 to transmit the plurality of user information stored in the storage 115 and the user configuration information input by the plurality of users to the server 120. Furthermore, when receiving user configuration information from the server 120, the controller 116 may control the vehicle 110 to apply the received user configuration information to the vehicle 110. In other words, the controller 116 may control a plurality of controlled devices to apply the user configuration information received from the server 120 to the plurality of controlled devices located in the vehicle 110.

When receiving a request to input user configuration information from the server 120, the controller 116 may obtain the user configuration information via the input device 113 or may obtain the user configuration information by receiving the user configuration information input via a portable terminal of the user, and may transmit the user configuration information to the server 120.

Figure 3:
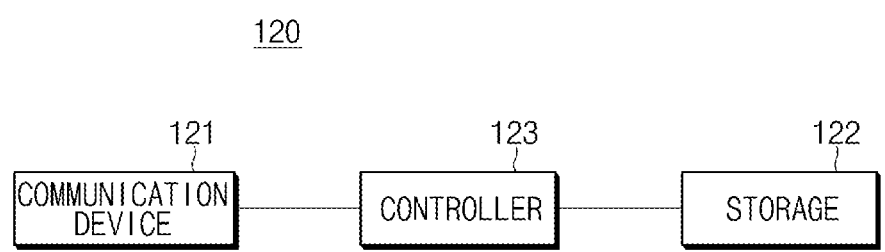
FIG. 3 is a block diagram illustrating a configuration of a server according to an exemplary embodiment of the present disclosure.

FIG. 3 is a block diagram illustrating a configuration of a server according to an exemplary embodiment of the present disclosure.

As shown in FIG. 3, a server 120 according to an exemplary embodiment of the present disclosure may include a communication device 121, a storage 122, and a controller 123.

The communication device 121 of the server 120 may be a hardware device implemented by various electronic circuits, e.g., processor(s), and may be communicatively connected with a collection vehicle 110-1 of FIG. 1 in a wired or wireless manner to receive data, including user configuration information or a plurality of user information obtained based on an input signal output from the input device 113 and a sensing value of a sensor 112 of FIG. 2, from the collection vehicle 110-1. Furthermore, the communication device 121 may be communicatively connected with a new vehicle 110-2 of FIG. 1 in a wired or wireless manner to receive user information from the new vehicle 110-2 or transmit user configuration information stored in the storage 122 or user configuration information calculated by the controller 123 to the new vehicle 110-2. The communication device 121 may be connected by a USB cable when wiredly connected and may be connected through Wi-Fi direct communication when wirelessly connected. According to an exemplary embodiment, the communication device 121 may be connected through short-range wireless communication such as Wibro, WiMAX, Bluetooth, RFID, IrDA, UWB, or ZigBee.

The storage 122 may store data including user configuration information and user information, which are received from the collection vehicle 110-1. The storage 122 may include at least one of a flash memory, a hard disc, a memory card, a ROM, a RAM, an EEPROM, a PROM, a magnetic memory, a magnetic disc, and/or an optical disc.

The controller 123 of the server 120 may be implemented by various processing devices such as a microprocessor and the like, in which a semiconductor chip or the like capable of calculating or executing various commands is embedded, and may control an overall operation of the server 120 according to an exemplary embodiment of the present disclosure.

The controller 123 may determine whether data received from the collection vehicle 110-1 is applicable to the new vehicle 110-2 and may determine whether to transform the data as a result of the determination. When it is determined to transform the data, the controller 123 may generate a transform formula for transforming the data. A description will be given in detail of the operation of the controller 123 for generating the transform formula with reference to FIG. 4.

The controller 123 may calculate user configuration information of the new vehicle 110-2 based on the transform formula generated to transform the data. According to an exemplary embodiment, when a first user rides in the new vehicle 110-2, the controller 123 may receive information from the new vehicle 110-2 and may determine whether first user configuration information of the new vehicle 110-2 is included in data stored in the storage 122, based on the received information. Herein, the information received from the new vehicle 110-2 may include information about the first user and information about the new vehicle 110-2. Herein, because of receiving only user information and vehicle information, rather than user configuration information of the new vehicle 110-2, from the new vehicle 110-2, the controller 123 may determine that the first user configuration information is not stored in the new vehicle 110-2. Thus, the controller 123 may determine whether the first user configuration information of the new vehicle 110-2 is stored in the storage 122. In this case, the first user configuration information of the new vehicle 110-2, stored in the storage 122, may refer to user information which is input after the first user rides in a vehicle of the same model as the new vehicle 110-2.

As a result, for the controller 123 to determine whether the first user configuration information of the new vehicle 110-2 is included in the data stored in the storage 122 may be understood as determining whether the information about the first user who rides in the vehicle of the same model as the new vehicle 110-2 is stored in the storage 122.

When it is determined that the first user configuration information of the new vehicle 110-2 is included in the data, the controller 123 may determine that the first user configuration information input by the first user who rides in the vehicle of the same model as the new vehicle 110-2 is included in the data and may determine that the data is applicable to the new vehicle 110-2 without a change in the data. The controller 123 may control the communication device 121 to transmit the data determined as being applicable to the new vehicle 110-2 to the new vehicle 110-2.

When it is determined that the first user configuration information of the new vehicle 110-2 is not included in the data, the controller 123 may determine that information about the first user who rides in the vehicle of the same model as the new vehicle 110-2 is not included in the data. In this case, the controller 123 may determine whether the first user configuration information of the collection vehicle 110-1 (a vehicle of a different model from the new vehicle 110-2) is included in the data.

When it is determined that the first user configuration information of the collection vehicle 110-1 is included in the data, because the collection vehicle 110-1 has a different model from the new vehicle 110-2, the controller 123 may determine that the data is not applicable to the new vehicle 110-2 without a change in the data, may calculate the first user configuration information of the new vehicle 110-2 using a transform formula previously generated based on the first user configuration information of the collection vehicle 110-1, and may transmit the calculated first user configuration information of the new vehicle 110-2 to the new vehicle 110-2.

Meanwhile, when it is determined that the first user configuration information of the collection vehicle 110-1 is not included in the data, the controller 123 may determine whether another user configuration information of the new vehicle 110-2 is included in the data. Herein, the other user configuration information of the new vehicle 110-2 may include information which is set after another user rather than the first user rides in a vehicle of the same model as the new vehicle 110-2.

When it is determined that the other user configuration information of the new vehicle 110-2 is included in the data, the controller 123 may determine that the data is not applicable to the new vehicle 110-2 without a change in the data, may calculate the first user configuration information of the new vehicle 110-2 using a transform formula previously generated based on the other user configuration information of the new vehicle 110-2, and may transmit the calculated first user configuration information of the new vehicle 110-2 to the new vehicle 110-2.

When it is determined that the first user configuration information of the collection vehicle 110-1 and the other user configuration information of the new vehicle 110-2 are not included in the data, the controller 123 may request the new vehicle 110-2 to transmit the first user configuration information of the new vehicle 110-2. In other words, when it is determined that both the first user configuration information of the collection vehicle 110-1 and the other user configuration information of the new vehicle 110-2 are not included in the data, the controller 123 may determine that it is unable to calculate the first user configuration information of the new vehicle 110-2 although using the transform formula. Thus, the controller 123 may request the new vehicle 110-2 such that the first user directly input configuration information of the new vehicle 110-2.

When receiving the first user configuration information from the new vehicle 110-2, the controller 123 may store the received first user configuration information in the storage 122.

Figure 4:
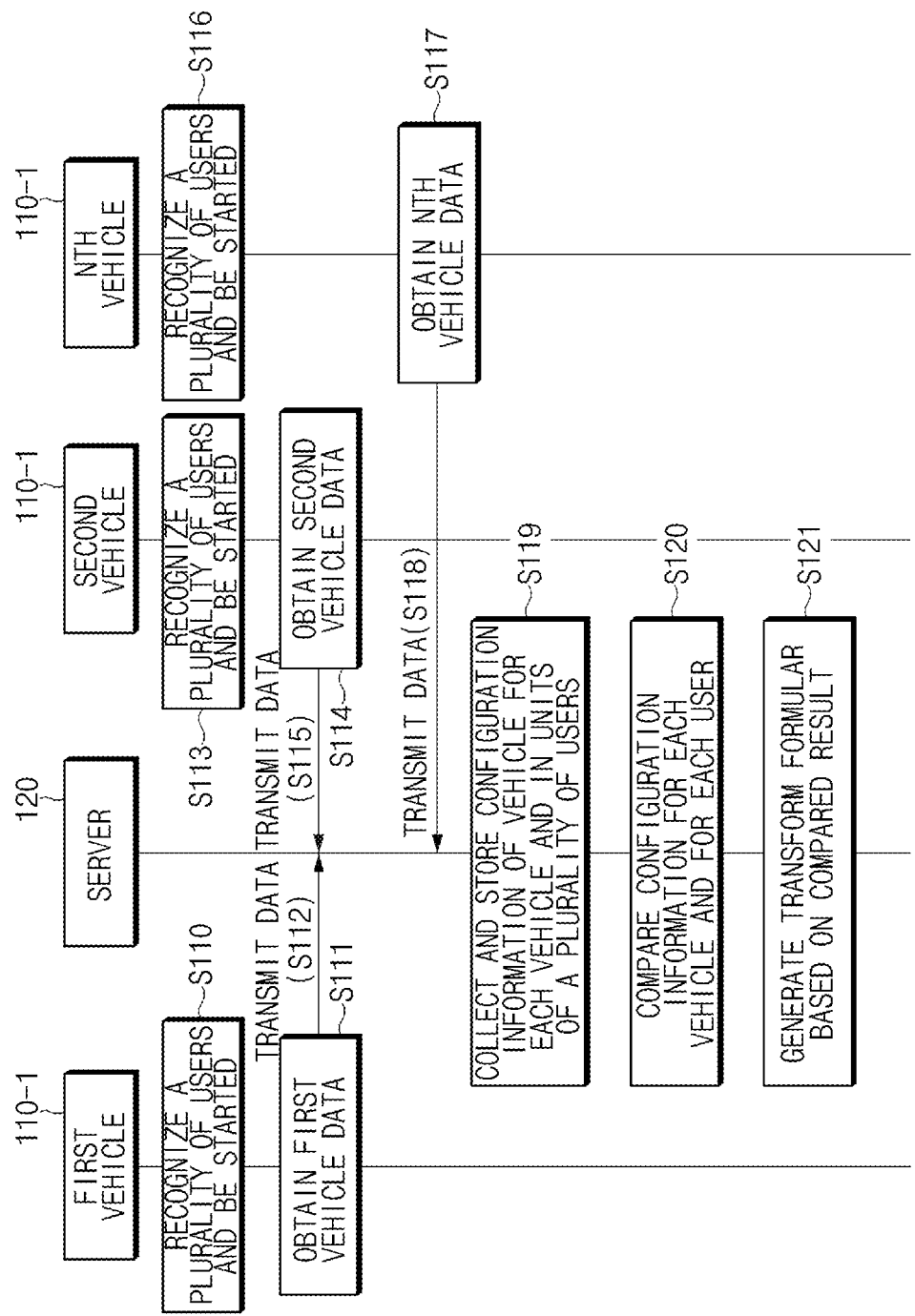
FIG. 4 is a signal sequence diagram illustrating a process of generating a transform formula according to an exemplary embodiment of the present disclosure.

FIG. 4 is a signal sequence diagram illustrating a process of generating a transform formula according to an exemplary embodiment of the present disclosure.

As shown in FIG. 4, a server 120 according to an exemplary embodiment of the present disclosure may receive information from a collection vehicle 110-1 and may generate a transform formula based on the received information. Herein, the collection vehicle 110-1 may include a plurality of vehicles. According to an exemplary embodiment of the present disclosure, the plurality of vehicles may include a first vehicle, a second vehicle, and an nth vehicle.

In detail, when a plurality of users ride in the first vehicle, the second vehicle, and the nth vehicle, in S110, S113, and S116, the collection vehicle 110-1 including the first vehicle, the second vehicle, and the nth vehicle may recognize the plurality of users based on biometric information obtained from a sensor 112, a camera 114, or the like of the collection vehicle 110-1 and may be started. In S110, S113, and S116, the collection vehicle 110-1 may interwork with a portable terminal of the user to recognize the user using a user authentication key stored in the portable terminal of the user.

After recognizing the plurality of users, in S111, S114, and S117, each of the first vehicle, the second vehicle, and the nth vehicle may obtain first vehicle data, second vehicle data, and the nth vehicle data, each of which includes configuration information input by the plurality of recognized users. In S111, S114, and S117, the first vehicle data, the second vehicle data, and the nth vehicle data may be obtained based on an input signal output from an input device of the collection vehicle 110-1. The collection vehicle 110-1 may receive and obtain user configuration information input via a user terminal. The first vehicle, the second vehicle data, and the nth vehicle data obtained in S111, S114, and S117 may be stored in the first vehicle, the second vehicle, and the nth vehicle, respectively.

In S112, S115, and S118, the first vehicle, the second vehicle, and the nth vehicle may transmit the first vehicle, the second vehicle data, and the nth vehicle data to the server 120. In S119, the server 120 may collect and store the received data separately for each vehicle and may collect and store the data, collected and stored separately for each vehicle, separately in units of a plurality of users.

In S120, the server 120 may compare a plurality of data stored for each user or may compare a plurality of data stored for each vehicle. In S121, the server 120 may generate a transform formula based on the result of the comparison. As an example, when receiving locations of seats in which a plurality of users of the first vehicle sit and when receiving locations of seats in which a plurality of users of the second vehicle sit in S120, in S121, the server 120 may generate a transform formula for being applied to the nth vehicle based on the locations of the seats of the first and second vehicles. Herein, an embodiment is exemplified as the transform formula is generated based on the locations of the seats. However, embodiments are not limited thereto. For example, the transform formula may be generated based on a control value of a controlled device located in the vehicle.

Although not illustrated, when the transform formula is generated, the server 120 may calculate user configuration information of a new vehicle using the transform formula. As an example, when user X (a new user) rides in the first vehicle and stores a location of the seat in which user X sits, the server 120 may calculate a location of the seat in which user X of the second vehicle sits, based on the location of the seat in which user X of the first vehicle sits and the transform formula. As another example, when the plurality of users ride in a vehicle of the same model as the new vehicle and store configuration information, the server 120 may calculate a location of the seat in which user X of the second vehicle sits, based on a plurality of user configuration information of the new vehicle and the transform formula.

Figure 5:
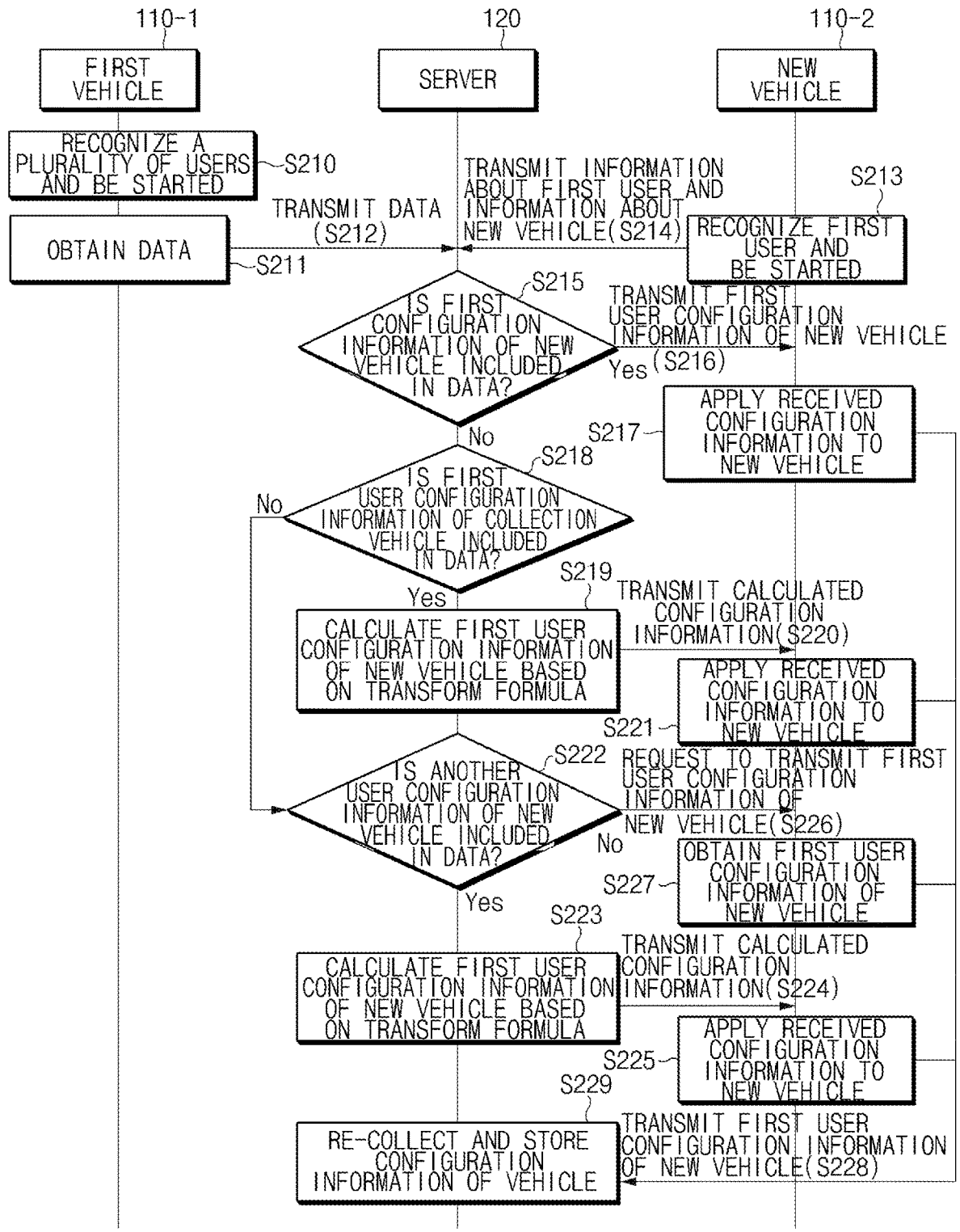
FIG. 5 is a signal sequence diagram illustrating an operation of a system for setting information about a vehicle according to an exemplary embodiment of the present disclosure.

FIG. 5 is a signal sequence diagram illustrating an operation of a system for setting information about a vehicle according to an exemplary embodiment of the present disclosure.

As shown in FIG. 5, in S210, a collection vehicle 110-1 (e.g., a first vehicle, a second vehicle, or an nth vehicle of FIG. 4) according to an exemplary embodiment of the present disclosure may recognize a plurality of users who ride in the collection vehicle 110-1 based on a sensor 112 and a camera 114 of the collection vehicle 110-1 and may be started. In S211, the collection vehicle 110-1 may obtain data including configuration information of the collection vehicle 1101-1, input from the plurality of users. In S211, the collection vehicle 110-1 may obtain the data based on an input signal output from an input device of the collection vehicle 110-1 or may receive user configuration information input via a portable terminal of the user from the portable terminal to obtain the data. The data obtained in S211 may be stored in the collection vehicle 110-1. In S212, the collection vehicle 110-1 may transmit the obtained data to a server 120.

In S213, a new vehicle 110-2 may recognize a first user who rides in the new vehicle 110-2, based on a sensor 112 and a camera 114 of the new vehicle 110-2 and may be started. In S214, the new vehicle 110-2 may transmit information about the first user and information about the new vehicle 110-2 to the server 120. In S214, the new vehicle 110-2 may transmit an identification number of a portable terminal of the first user as the information about the first user. When the first user who rides in the new vehicle 110-2 is recognized, the new vehicle 110-2 may transmit the information about the first user and the information about the new vehicle 110-2 to the server 120. Herein, the information about the first user may include an identification number of a portable terminal of the first user, and the information about the new vehicle 110-2 may include a vehicle identification number (VIN). Herein, the first user may be a user different from the plurality of users which input configuration information of the collection vehicle 110-1.

In S215, the server 120 may determine whether there is first user configuration information of the new vehicle 110-2 based on the data received from the collection vehicle 110-1 and the information about the first user, received from the new vehicle 110-2. In S215, because the configuration information of the new vehicle 110-2 is not received from the new vehicle 110-2, the server 120 may determine that the first user configuration information is not stored in the new vehicle 110-2. Thus, the server 120 may determine whether the first user configuration information of the new vehicle 110-2 is included in the data received from the collection vehicle 110-1. Herein, the first user configuration information of the new vehicle 110-2, included in the data, may refer to user information which is input after the first user rides in a vehicle of the same model as the new vehicle 110-2.

When it is determined that the first user configuration information of the new vehicle 110-2 is included in the data in S215 (Yes), the server 120 may determine that there is the first user configuration information of the first user who rides in the vehicle of the same model as the new vehicle 110-2 and may determine that the data is applicable to the new vehicle 110-2 without a change of the data. In S216, the server 120 may transmit the data determined as being applicable to the new vehicle 110-2 (the first user configuration information of the new vehicle 110-2) to the new vehicle 110-2.

When receiving the data (the first user configuration information of the new vehicle 110-2) from the server 120, in S217, the new vehicle 110-2 may apply the received information. Applying the information in S217 may refer to setting the received first user configuration information as a control value of a controlled device of the new vehicle 110-2. Thereafter, in S228, the new vehicle 110-2 may transmit the applied first user configuration information to the server 120.

Meanwhile, when it is determined that the first user configuration information of the new vehicle 110-2 is not included in the data in S215 (No), the server 120 may determine that the first user configuration information, set by the first user who rides in the vehicle of the same model as the new vehicle 110-2, is not included in the data. In S218, the server 120 may determine whether the first user configuration information of the collection vehicle 110-1 is included in the data.

When it is determined that the first user configuration information of the collection vehicle 110-1 is included in the data in S218 (Yes), the server 120 may determine that the data is not applicable to the new vehicle 110-2 without a change in the data and, in S219, may calculate first user configuration information of the new vehicle 110-2 using a transform formula previously generated based on the first user configuration information of the collection vehicle 110-1. In S220, the server 120 may transmit the calculated first user configuration information of the new vehicle 110-2 to the new vehicle 110-2. When receiving the calculated first user configuration information of the new vehicle 110-2 from the server 120, in S221, the new vehicle 110-2 may apply the received information. Applying the information in S221 may refer to setting the first user configuration information calculated by the server 120 as a control value of a controlled device of the new vehicle 110-2. Thereafter, in S228, the new vehicle 110-2 may transmit the applied first user configuration information to the server 120.

Meanwhile, when it is determined that the first user configuration information of the collection vehicle 110-1 is not included in the data in S218 (No), in S222, the server 120 may determine whether another user configuration information of the new vehicle 110-2 is included in the data. Herein, the other user configuration information of the new vehicle 110-2 may include information which is set after a user rather than the first user rides in the vehicle of the same model as the new vehicle 110-2.

When it is determined that the other user configuration information of the new vehicle 110-2 is included in the data in S222 (Yes), the server 120 may determine that the data is not applicable to the new vehicle 110-2 without a change in the data and, in S223, may calculate first user configuration information of the new vehicle 110-2 using a transform formula previously generated based on the other user configuration information of the new vehicle 110-2. In S224, the server 120 may transmit the calculated first user configuration information of the new vehicle 110-2 to the new vehicle 110-2. When receiving the calculated first user configuration information of the new vehicle 110-2 from the server 120, in S225, the new vehicle 110-2 may apply the received information. Applying the information in S225 may refer to setting the first user configuration information calculated by the server 120 as a control value of a controlled device of the new vehicle 110-2. Thereafter, in S228, the new vehicle 110-2 may transmit the applied first user configuration information to the server 120.

Meanwhile, when it is determined that the other user configuration information of the new vehicle 110-2 is not included in the data in S222 (No), in S226, the server 120 may request the new vehicle 110-2 to transmit the first user configuration information of the new vehicle 110-2. In other words, when it is determined that both the first user configuration information of the collection vehicle 110-1 and the other user configuration information of the new vehicle 110-2 are not included in the data in S222, the server 120 may determine that it is unable to calculate the first user configuration information of the new vehicle 110-2 although using the transform formula. Thus, in S226, the server 120 may request the new vehicle 110-2 such that the first user directly inputs configuration information of the new vehicle 110-2.

When receiving the request such that the first user inputs the configuration information of the new vehicle 110-2 from the server 120, in S227, the new vehicle 110-2 may obtain user configuration information based on an input signal output from the input device 113 or may obtain configuration information by receiving the configuration information input to a portable terminal of the first user. In S228, the new vehicle 110-2 may transmit the first user configuration information of the new vehicle 110-2 to the server 120.

In S229, the server 120 may store the first user configuration information received from the new vehicle 110-2 in the storage 122.

Figure 6:
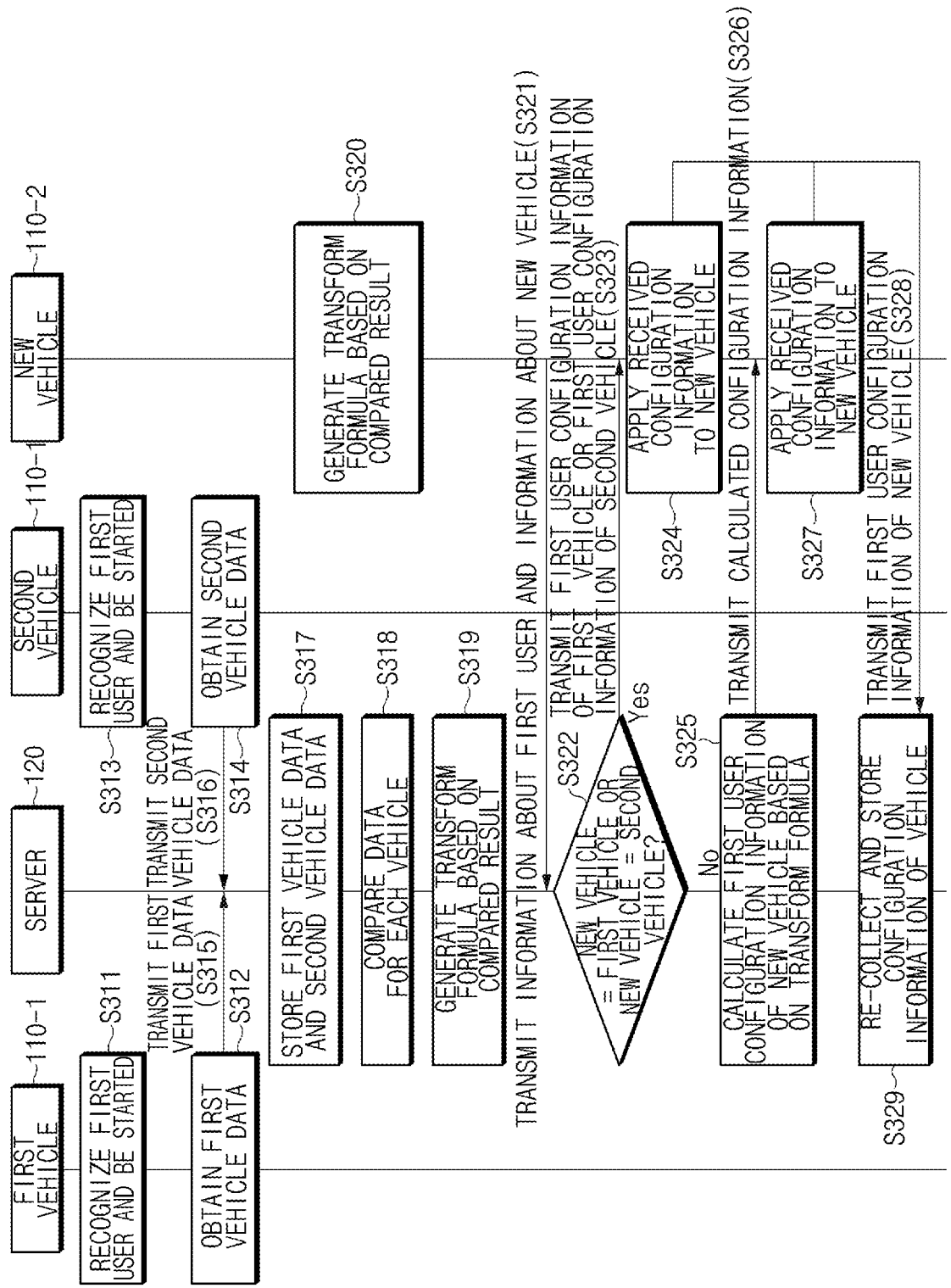
FIG. 6 is a signal sequence diagram illustrating an operation of a system for setting information about a vehicle according to another exemplary embodiment of the present disclosure.

FIG. 6 is a signal sequence diagram illustrating an operation of a system for setting information about a vehicle according to another exemplary embodiment of the present disclosure.

As shown in FIG. 6, according to an exemplary embodiment of the present disclosure, in S311 and S313, a collection vehicle 110-1 (hereinafter referred to as "first vehicle 110-1" or "second vehicle 110-1") may recognize first users who ride in the first vehicle 110-1 and the second vehicle 110-1 based on a sensor 112 and a camera 114 of each of the first vehicle 110-1 and the second vehicle 110-1 and may be started. In S312, the first vehicle 110-1 may obtain first vehicle data including configuration information input from the first user. In S314, the second vehicle 110-1 may obtain second vehicle data including configuration information input from the first user. In S312 and S314, the first vehicle data and the second vehicle data may be obtained based on input signals output from an input device of the first vehicle 110-1 and an input device of the second vehicle 110-1 or may be obtained by receiving user configuration information input via a portable terminal of the first user from the portable terminal. The first vehicle data and the second vehicle data obtained in S312 and S314 may be stored in the first vehicle 110-1 and the second vehicle 110-1, respectively. In S315 and S316, the first vehicle 110-1 and the second vehicle 110-1 may transmit the obtained first vehicle data and the obtained second vehicle data to a server 120.

In S317, the server 120 may store the first vehicle data and the second vehicle data. In S318, the server 120 may compare data for each vehicle. In S319, the server 120 may generate a transform formula based on the result of the comparison. When receiving a location of the seat in which the first user of the first vehicle 110-1 sits and when receiving a location of the seat in which the first user of the second vehicle sits, in S319, the server 120 may generate the transform formula based on the locations of the seats in which the first users of the first vehicle 110-1 and the second vehicle 110-1 sit. Herein, an embodiment is exemplified as the transform formula is generated based on the locations of the seats. However, embodiments are not limited thereto. For example, the transform formula may be generated based on a control value of a controlled device located in the vehicle.

In S320, a new vehicle 110-2 may recognize a first user who rides in the new vehicle 110-2, based on a sensor 112 and a camera 114 of the new vehicle 110-2 and may be started. In S321, the new vehicle 110-2 may transmit information about the first user and information about the new vehicle 110-2 to the server 120. In S321, the new vehicle 110-2 may transmit an identification number of a portable terminal of the first user as the information about the first user. The information about the new vehicle 110-2 may include a vehicle identification number (VIN).

In S322, the server 120 may determine whether the new vehicle 110-2 has the same model as the first vehicle 110-1 or the second vehicle 110-1, based on the data received from the first vehicle 110-1 and the second vehicle 110-1 and the information about the new vehicle 110-2, received from the new vehicle 110-2.

When it is determined that the new vehicle 110-2 has the same model as the first vehicle 110-1 or the second vehicle 110-1 in S322 (Yes), in S323, the server 120 may transmit first user configuration information of the first vehicle 110-1 or first user configuration information of the second vehicle 110-1 to the new vehicle 110-2. In S324, the new vehicle 110-2 may receive the first user configuration information of the first vehicle 110-1 and the first user configuration information of the second vehicle 110-1, which are received from the server 120, and may apply the received information. Applying the information in S324 may refer to setting the first user configuration information of the first vehicle 110-1 or the first user configuration information of the second vehicle 110-1, which are received from the server 120, as a control value of a controlled device of the new vehicle 110-2.

When it is determined that the new vehicle 110-2 does not have the same model as the first vehicle 110-1 or does not have the same model as the second vehicle 110-1 in S322 (No), in S325, the server 120 may calculate first user configuration information of the new vehicle 110-2 based on the transform formula calculated in S319. In S326, the server 120 may transmit the first user configuration information of the new vehicle 110-2, calculated in S325, to the new vehicle 110-2. In S327, the new vehicle 110-2 may apply the first user configuration information calculated by the server 120 to the new vehicle 1102. Applying the information in S327 may refer to setting the first user configuration information calculated by the server 120 as a control value of a controlled device of the new vehicle 110-2. In S329, the new vehicle 110-2 may transmit the applied first user configuration information to the server 120.

Figure 7:
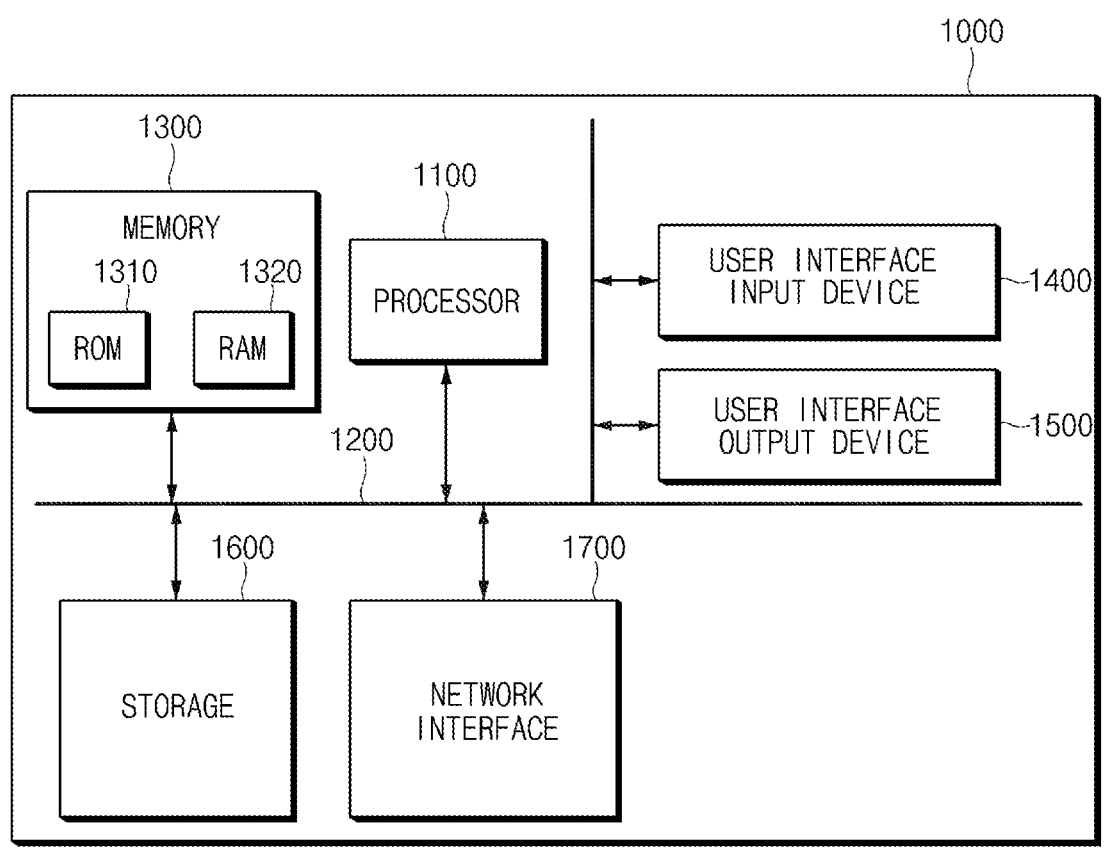
FIG. 7 is a block diagram illustrating a computing system which executes an operation of a system for setting information about a vehicle according to an exemplary embodiment of the present disclosure.

FIG. 7 is a block diagram illustrating a computing system which executes an operation of a system for setting information about a vehicle according to an exemplary embodiment of the present disclosure.

Referring to FIG. 7, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to an exemplary embodiment of the present disclosure, the system and method for setting the information about the vehicle may actively provide a user customized service irrespective of a model by controlling a device in a vehicle (e.g., a rental car or the like) to which user configuration information is not input, based on the user configuration information stored in vehicles of at least one or more models.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A system for setting configuration information about a vehicle, the system comprising:
   a collection vehicle and a new vehicle, which is a vehicle separate from the collection vehicle, each of the collection vehicle and the new vehicle including:
      a sensor configured to obtain configuration information of a plurality of drivers set for a plurality of electronic devices located in a corresponding one of the collection vehicle and the new vehicle;
      an input device configured to receive the configuration information from the plurality of drivers;
      a communication device configured to transmit the configuration information to a server; and
      a controller configured to control the plurality of electronic devices located in the corresponding one of the collection vehicle and the new vehicle,
      wherein the configuration information, obtained by the sensor or the input device, includes at least one of a control value set for a vehicle seat, a control value set for a room mirror or a side mirror, a control value set for a steering wheel, a control value set for an air conditioning device, or a control value set for a multimedia device; and
   the server configured to receive the configuration information from the collection vehicle, to determine whether the configuration information received from the collection vehicle is applicable to the new vehicle, and to determine whether to transform the configuration information depending on whether the configuration information is applicable to the new vehicle,
   wherein the new vehicle transmits information about a first driver and information about the new vehicle to the server when the first driver who rides in the new vehicle is recognized,
   wherein, when the new vehicle is identified to be a same model as the collection vehicle and configuration information of the first driver riding in the collection vehicle, identified as the same model as the new vehicle, is included in the configuration information of the plurality of drivers received from the collection vehicle, the server determines that the configuration information of the first driver received from the collection vehicle is applicable to the new vehicle,
   wherein, when the configuration information of the first driver obtained from the collection vehicle is determined applicable to the new vehicle, the server transmits the configuration information of the first driver to the new vehicle so that the controller of the new vehicle controls the electronic devices located in the new vehicle based on the transmitted configuration information set for the first driver, and
   wherein, when the configuration information obtained from the collection vehicle is determined not applicable to the new vehicle, the server transforms the configuration information obtained from the collection vehicle such that the configuration information obtained from the collection vehicle is applicable to the new vehicle.

2. The system of claim 1, wherein the server determines that the configuration information obtained from the collection vehicle is not applicable to the new vehicle, when the configuration information of the first driver riding in the collection vehicle that is identified to be the same model as the new vehicle is not included in the configuration information of the plurality of drivers received from the collection vehicle, and
   the server determines whether configuration information of the first driver riding in the collection vehicle that is a different model from the new vehicle is included in the configuration information of the plurality of drivers received from the collection vehicle.

3. The system of claim 2, wherein the server transforms the configuration information obtained from the collection vehicle such that the configuration information of the first driver riding in the collection vehicle that is the different model from the new vehicle is applicable to the new vehicle, when the configuration information of the first driver riding in the collection vehicle that is the different model from the new vehicle is included in the configuration information of the plurality of drivers received from the collection vehicle, and
   the server transmits the transformed configuration information obtained from the collection vehicle to the new vehicle.

4. The system of claim 2, wherein the server determines whether configuration information of a second driver riding in the collection vehicle that is identified to be the same model as the new vehicle is included in the configuration information of the plurality of drivers received from the collection vehicle, when the configuration information of the first driver riding in the collection vehicle that is the different model from the new vehicle is not included in the configuration information of the plurality of drivers received from the collection vehicle.

5. The system of claim 4, wherein the server transforms the configuration information of the second driver such that the configuration information of the second driver riding in the collection vehicle that is the same model as the new vehicle is applicable to the new vehicle, when the configuration information of the second driver riding in the collection vehicle that is identified to be the same model as the new vehicle is included in the configuration information of the plurality of drivers received from the collection vehicle, and
   the server transmits the transformed configuration information of the second driver to the new vehicle.

6. A method for setting configuration information about a vehicle, the method comprising:
   obtaining, by a collection vehicle, configuration information of a plurality of drivers set for a plurality of electronic devices located in the collection vehicle and transmitting the obtained configuration information to a server, wherein the configuration information, obtained by a sensor or an input device of the collection vehicle, includes at least one of a control value set for a vehicle seat, a control value set for a room mirror or a side mirror, a control value set for a steering wheel, a control value set for an air conditioning device, or a control value set for a multimedia device;
   transmitting, by a new vehicle, information about a first driver and information about the new vehicle to the server when the first driver who rides in the new vehicle is recognized;
   determining, by the server, whether the configuration information received from the collection vehicle is applicable to the new vehicle; and
   determining, by the server, whether to transform the configuration information depending on whether the data is applicable to the new vehicle, wherein, in the determining whether the configuration information received from the collection vehicle is applicable to a new vehicle, when the new vehicle is identified to be a same model as the collection vehicle and configuration information of the first driver riding in the collection vehicle, identified as the same model as the new vehicle, is included in the configuration information of the plurality of drivers received from the collection vehicle, the server determines that the configuration information of the first driver received from the collection vehicle is applicable to the new vehicle, wherein, when the configuration information of the first driver obtained from the collection vehicle is determined applicable to the new vehicle, the server transmits the configuration information of the first driver to the new vehicle so that a controller of the new vehicle controls the electronic devices located in the new vehicle based on the transmitted configuration information set for the first driver, and wherein, when the configuration information obtained from the collection vehicle is determined not applicable to the new vehicle, the server transforms the configuration information obtained from the collection vehicle such that the configuration information obtained from the collection vehicle is applicable to the new vehicle.

7. The method of claim 6, further comprising:

determining, by the server, that the configuration information obtained from the collection vehicle is not applicable to new vehicle, when the configuration information of the first driver riding in the collection vehicle that is identified to be the same model as the new vehicle is not included in the configuration information of the plurality of drivers received from the collection vehicle; and determining, by the server, whether configuration information of the first driver riding in the collection vehicle that is a different model from the new vehicle is included in the configuration information of the plurality of drivers received from the collection vehicle.

8. The method of claim 7, further comprising:

transforming, by the server, the configuration information obtained from the collection vehicle such that the configuration information of the first driver riding in the collection vehicle that is the different model from the new vehicle is applicable to the new vehicle, when the server determines that the configuration information of the first driver riding in the collection vehicle that is the different model from the new vehicle is included in the configuration information of the plurality of drivers received from the collection vehicle; and transmitting, by the server, the transformed configuration information obtained from the collection vehicle to the new vehicle.

9. The method of claim 7, further comprising:

determining, by the server, whether configuration information of a second driver riding in the collection vehicle that is identified to be the same model as the new vehicle is included in the configuration information of the plurality of drivers received from the collection vehicle, when the configuration information of the first driver riding in the collection vehicle that is the different model from the new vehicle is not included in the configuration information of the plurality of drivers received from the collection vehicle.

10. The method of claim 9, further comprising:

transforming, by the server, the configuration information of the second driver such that the configuration information of the second driver riding in the collection vehicle that is the same model as the new vehicle is applicable to the new vehicle when the configuration information of the second driver riding in the collection vehicle that is identified to be the same model as the new vehicle is included in the configuration information of the plurality of drivers received from the collection vehicle; and transmitting, by the server, the transformed configuration information of the second driver to the new vehicle.

* * * * *